UNITED STATES PATENT OFFICE.

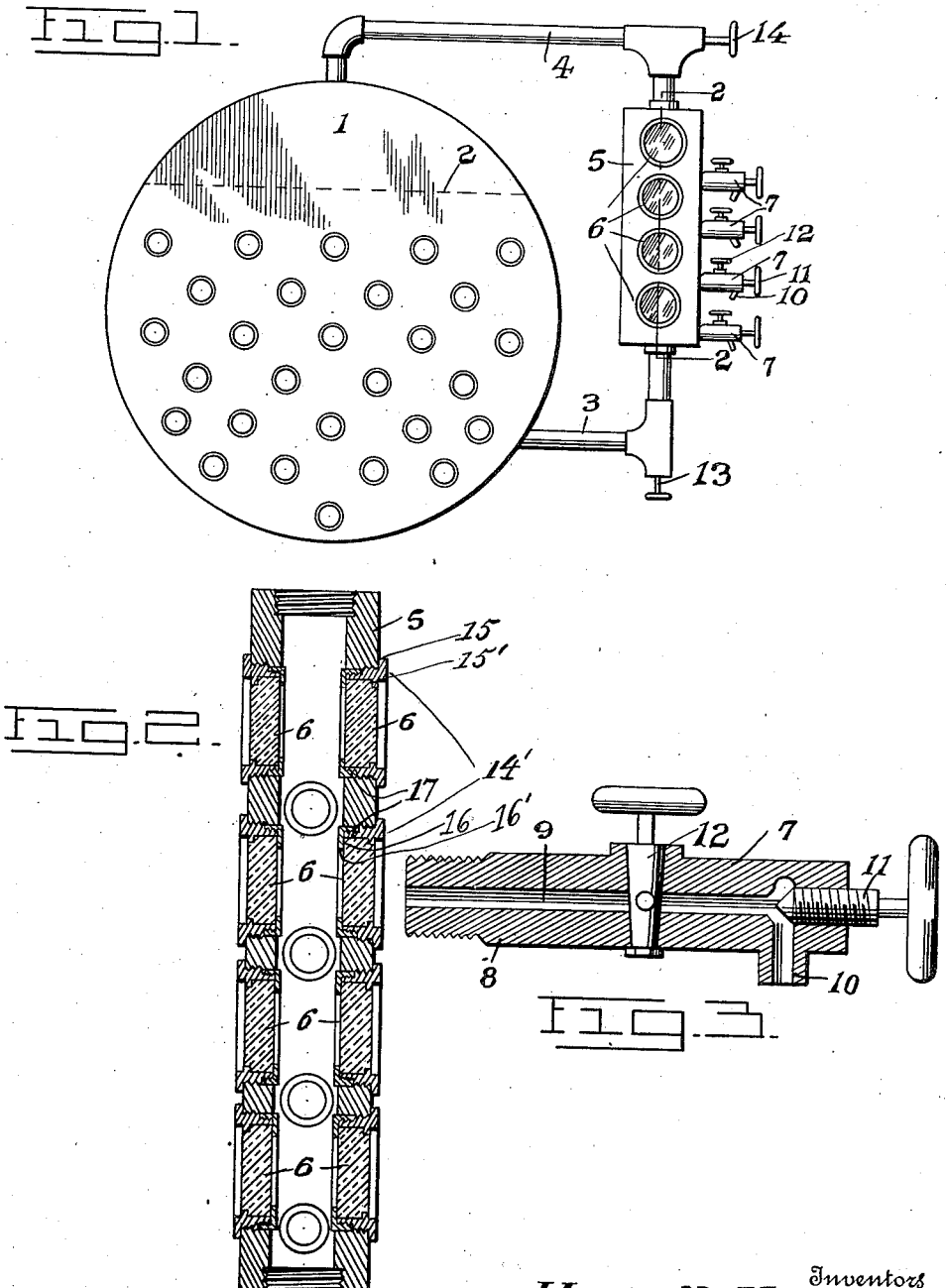

HARTSELL H. CROSS AND WALTER F. WRATCHFORD, OF HENDRICKS, WEST VIRGINIA.

COLUMN FOR STEAM-BOILERS.

1,074,493.  Specification of Letters Patent. Patented Sept. 30, 1913.

Application filed July 14, 1911. Serial No. 638,516.

*To all whom it may concern:*

Be it known that we, HARTSELL H. CROSS and WALTER F. WRATCHFORD, citizens of the United States, residing at Hendricks, in the county of Tucker and State of West Virginia, have invented new and useful Improvements in Columns for Steam-Boilers, of which the following is a specification.

This invention relates to water columns for boilers and the object of the invention is the provision of a column having means whereby the height of the water in the boiler may be readily seen without operating the pet cocks and whereby the main stems of the pet cocks may be removed and properly ground without drawing the steam and whereby, when the main valve stem is closed, the height of the water in the boiler may be determined independent of the pet cock.

Further objects of the invention will appear as the following specific description is read in connection with the accompanying drawing, which forms a part of this application, and in which:—

Figure 1 is a side elevation. Fig. 2 is a section taken through the column on the line 2—2 of Fig. 1. Fig. 3 is a section through one of the pet cocks.

Referring more particularly to the drawing, 1 represents a boiler and 2 indicates by dotted lines the normal water level. Extending from the boiler below and above the normal water level are pipes 3 and 4, the former of which is connected to the lower part of a water column 5 and the latter pipe 4 connected to the upper part. This column is preferably cast as an integral part although it may be constructed in any other suitable manner and is hollow to receive the water and steam from the boiler. Secured in each side directly opposite each other are sight glasses 6. The sight glasses 6 are arranged in suitable alined openings at the opposite sides of the column 5 and threadedly secured within said opening and surrounding the sight glasses are annular members 14' having flanges 15 which bear against the outer surface of the column, and internal flanges 15' bearing against the outer surface of the sight glasses. Each of said annular members has a reduced threaded portion 17 upon which is threadedly secured a flanged ring member 16, the flanged portion 16' of which bears against the opposite surface of the sight glasses 6 to retain the same positioned within the openings of the column 5. Extending at right angles to the line of sight therethrough is a plurality of pet cocks 7. These pet cocks 7 each comprises a casing 8 having a passage 9 extending therethrough to the discharge nozzle or spout 10. The passage is closed by a main needle valve 11 and an auxiliary valve 12 is also arranged in the casing and is adapted to close the passage when the main needle valve is removed for grinding. The entire column may be cut off from the boiler by means of valves 13 and 14 located in the pipes 3 and 4 respectively.

It is a well-known fact among engineers that the pet cocks formerly used have to be ground at frequent intervals to secure proper seating. In order to do this the steam has to be drawn from the boiler which entails a considerable amount of labor and also considerable loss of time. By using the type of pet cock illustrated, in combination with the sight glasses, the main valves may be properly ground and at the same time the condition of the water in the boiler readily ascertained by an inspection of the column through the sight glasses, the latter being alined to permit better inspection.

Having thus described the invention, what we claim as new is:—

A water gage comprising a tubular body having a series of alined spaced openings at the opposite sides thereof, annular members threaded in said openings and having flanges bearing against said tubular body and having internal flanges adjacent the first mentioned flanges, said members having a reduced portion to provide an annular shoulder, transparent members secured within said annular members, each having a reduced portion on one face thereof to provide a shoulder adapted to bear against said internal flanges, and a flanged ring threadedly secured to said reduced portion of the annular member and having its flanged portion bearing against the opposite face of the transparent member.

In testimony whereof we affix our signatures in presence of two witnesses.

HARTSELL H. CROSS.
WALTER F. WRATCHFORD.

Witnesses:
LEO. P. BROUN,
BARNEY S. NICHOLS.